United States Patent [19]

Haake

[11] Patent Number: 4,464,984
[45] Date of Patent: Aug. 14, 1984

[54] PLANT FOR THE PREPARATION OF FODDER

[76] Inventor: Hinrich A. Haake, Gut Stellmoor, D-2070 Ahrensburg, Fed. Rep. of Germany

[21] Appl. No.: 369,015

[22] PCT Filed: Aug. 13, 1981

[86] PCT No.: PCT/EP81/00122
§ 371 Date: Apr. 8, 1982
§ 102(e) Date: Apr. 8, 1982

[87] PCT Pub. No.: WO82/00566
PCT Pub. Date: Mar. 4, 1982

[30] Foreign Application Priority Data

Aug. 16, 1980 [DE] Fed. Rep. of Germany ....... 3031030

[51] Int. Cl.³ .................. A23N 17/00; A01F 25/20
[52] U.S. Cl. .......................... 99/479; 99/467; 99/516; 99/536; 99/646 S; 414/292; 414/305; 414/325
[58] Field of Search .............. 99/454, 467, 468, 469, 99/471, 472, 479, 473–476, 477, 478, 486, 489, 516, 536, 646 R, 646 S; 366/603; 241/101 B; 414/325, 305, 326, 292; 98/1.5, 52, 55; 137/151, 144, 142; 34/227

[56] References Cited

U.S. PATENT DOCUMENTS

| | | | |
|---|---|---|---|
| 2,551,216 | 6/1945 | Martin | 99/479 |
| 2,821,993 | 2/1958 | Pacey et al. | 137/144 |
| 3,140,161 | 7/1964 | Poynor et al. | 98/52 X |
| 3,251,292 | 5/1966 | Vaughan | 99/468 X |
| 3,487,960 | 1/1970 | Evers | 99/646 S X |
| 3,646,874 | 3/1972 | Hamerski | 99/646 S X |
| 4,201,348 | 5/1980 | Bigbee et al. | 366/603 X |

FOREIGN PATENT DOCUMENTS

| | | |
|---|---|---|
| 1160791 | 1/1964 | Fed. Rep. of Germany . |
| 1178634 | 5/1965 | Fed. Rep. of Germany . |
| 2515052 | 10/1976 | Fed. Rep. of Germany . |

*Primary Examiner*—Timothy F. Simone
*Attorney, Agent, or Firm*—Lane, Aitken & Kananen

[57] ABSTRACT

A plant for the preparation of fodder comprising a portion of solid foodstock in the form of grains or kernels and a portion of water. The plant includes a silo for the solid foodstock, a device for removing the solid foodstock from the silo, a conveying device for conveying the solid foodstock removed from the silo, a crushing mill which receives and crushes foodstock conveyed by the conveying device, and a mixing vessel for the mixing of the crushed solid foodstock and the water. A siphon is mounted between the conveying device and the crushing mill, the siphon being provided with water supply conduits at the inlet and outlet sides of the siphon.

15 Claims, 3 Drawing Figures

PLANT FOR THE PREPARATION OF FODDER

BACKGROUND OF THE INVENTION

The invention relates to a plant for the preparation of fodder comprising a portion of solid foodstock in the form of grains or kernels, particularly corn, and a portion of water, said plant including a silo for the solid foodstock, a device for removing solid foodstock from the silo, a conveying device for conveying the solid foodstock removed from the silo to a crushing mill, and a mixing vessel for the mixing of the crushed solid foodstock and the water.

In the preparation of pig food, which comprises a substantial proportion of corn, so far, the practice has been to bring the corn portion into an agitator vessel in which is already contained a predetermined quantity of water. After the agitator or stirring means has been set in motion the corn portion and the water are mixed and can then be transported through a known distributing device to the feeding location.

The feeding in of corn into a mixing vessel is difficult, if only for the reason that this solid foodstock is of sticky consistency; it has to be considered in this connection that the solids portions are not only corn kernels but also rests of corncob stems. Therefore, it has become usual to mount a mill on the top of the mixing vessel and to charge said mill with the solid foodstock. In this way the mill is in a position to crush the material fed thereinto and directly deliver it to the mixing vessel.

In the meantime, it has also been proposed to perform the crushing operation while adding water to the material being crushed. This has the advantage that the energy required for the crushing process can be reduced, but special provisions must be made to ensure that the eventually obtained prepared fodder will contain the corn portion and water in the proper mixing ratio.

For the solid foodstock portion, particularly for corn-containing pig food, the corn, after the harvest, is introduced into silos and stored therein under airtight conditions. Now, in order to permit removal of said material from the silo, there is provided e.g. a milling cutter at the bottom of the silo whereby the corn material milled off is transported to the outside by a conveyor chain. However, such a device is not satisfactory, if only for the reason that due to the mode of transportation of the milled off material it is not possible to prevent air from getting into the silo. This causes decomposition processes in the stored material.

Therefore, it has become usual to attach a worm to the outlet end of the milling cutter, the worm housing being connected to the housing of the milling cutter by an airtight joint. The worm will now convey the milled off and dislodged material outwardly and, preferably, the material while being conveyed will also be compressed so that no oxygen can get into the silo. Only the forwardmost portion of the material being brought out in this way will be exposed to oxygen, and the undesirable decomposition processes will take place only in a relatively thin layer at that surface. However, that method is disadvantageous in that relatively high amounts of energy are required for conveying and compressing the solid foodstock and in that moreover, the compressed material must subsequently be milled or crushed, with further application of energy. Also, it is inconvenient that not only the silo bin but also the worm with its housing and the mixing vessel and the crushing mill must be in a specific spatial relationship with one another in order that the material being removed from the silo can be conveyed through the mill into the mixing vessel.

The problem underlying the invention now is to so develop a plant of the type indicated hereinbefore that in the preparation of fodder as little energy as possible will be needed but, on the other hand, fine milling of the fodder, particularly mixtures of corn kernels and corncob stem parts (CCM) will be possible. Also, the respective plant shall be so designed that the spatial relationship or association of the individual parts of the plant will not be critical; particularly, it shall be possible to take foodstock out of several silo bins and to prepare fodder in one and the same mixing vessel.

SUMMARY OF THE INVENTION

The invention is characterized by the fact that a siphon is mounted between the conveying device and the crushing mill, said siphon being provided with water supply conduits at the inlet and outlet sides thereof.

The siphon preferably located at the silo permits a satisfactory sealing of the material contained in the silo from the atmosphere, for, due to the siphon being filled with water it is impossible for gas to get into the silo from the outside. On the other hand, any material removed from the silo is passed through the siphon and thereby some of the water in the siphon will necessarily be entrained, so that, according to the invention, water supply conduits are provided for both sides of the siphon.

If water would be supplied only at the outlet side of the siphon, material taken out of the silo could not be conveyed therethrough. If, on the other hand, water would be supplied only on the other side of the siphon, the transportation of the material would be improved, but it might happen that water flows back too far into the silo, which would not be harmful but would be for no purpose.

According to the invention, the water inflows for the siphon are controlled through valves so that water can be supplied to the inlet and outlet sides of the siphon though a given program in dependence on certain operating parameters (e.g. the current consumption of the motor for the crushing mill). Theoretically, it would be possible to take the amount of water fed into the siphon directly from the water supply, but then it would be necessary to take steps to ensure that the finally produced fodder will have the desired composition of solid foodstock and water. Therefore, according to the invention, it is considered expedient to introduce a predetermined fixed amount of water into the mixing vessel prior to the preparation process. Thereafter, the supply of water is terminated and the water required in the plant according to the invention is taken from the mixing vessel and conducted to the inlet and outlet sides of the siphon. The supplied amounts of water are not critical; they cannot impair the fixed mixture ratio since the preparation process is terminated when a sufficient amount of solid foodstock has been removed from the silo, that means the amount that is in the desired proportion to the initially given amount of water. It is significant that by this method it is possible to positively maintain the predetermined mixing proportion, and the quantity being conveyed per unit of time can be adjusted as desired through the supply of water to the inlet side or outlet side of the siphon.

According to the invention any conveying device may be provided in the bottom or base portion of the siphon to convey the solid foodstock located therein from one side of the siphon to the other. A number of devices are conceivable here; for example, there might also be used a worm. In the preparation or processing of grain, for example, a conveying device might possibly be dispensed with.

In the preparation of corn fodder (CCM), a plate or tray having webs or ribs thereon is a suitable conveying device, so that by rotating the plate or tray the solid foodstock can be conveyed from one side of the siphon to the other. With the construction chosen according to the invention the drive shaft for the plate or tray is supported outside the siphon and the driving means for said shaft is also located outside the siphon. In this way, difficult mounting and sealing problems are avoided. According to the invention, the speed of the tray or plate may be preset as a fixed speed, for the rate of transportation of solid foodstock shall not be regulated by way of the speed of the plate or tray as according to the invention it shall be the amount of water supplied to the siphon that shall be responsible for this.

The invention may be realized in connection with a well-known Harvestore bottom-discharge milling cutter that is provided with a revolving chain but, in accordance with the invention, there may also be used other means for conveying and carrying off solid foodstock. Thus, according to the invention, nozzles may be installed in the silo in the lower part thereof, the water jets of said nozzles being effective to dislodge material from the silo. This material then falls into the lower zone of the silo, especially when, after a certain period of time, the supply of water to the nozzles is disconnected. Then, further nozzles can be put in action whereby the material which has collected in the lower zone of the silo is conveyed in the direction towards the siphon. The water used for the nozzles may also be branched off from the mixing vessel and brought to the required pressure by pumps. Altogether, in connection with the water conservation in the plant according to the invention, it has to be stated that for a predetermined quantity of fodder to be prepared sufficient water is available for the reason that said water can circulate while it is ensured all the same that the water content of the fodder produced will not be too high.

The invention may also be used in connection with a discharging device provided at the lower end of a Harvestore bin and substantially comprising a spindle driven by means of a motor. Wound on said spindle is a chain the radial length of which is greater or less depending on the axial position. As the spindle is rotated, the chain revolving therewith can knock off, loosen and detach the material stored in the silo so that this material will fall into the collecting vessel below or get into the conveying means through the siphon to the mill.

Further embodiments of the invention may be learned from the various patent claims.

BRIEF DESCRIPTION OF THE DRAWINGS

The invention will now be explained by way of example by reference to the drawings wherein.

DESCRIPTION OF THE PREFERRED EMBODIMENTS

Figure 1:
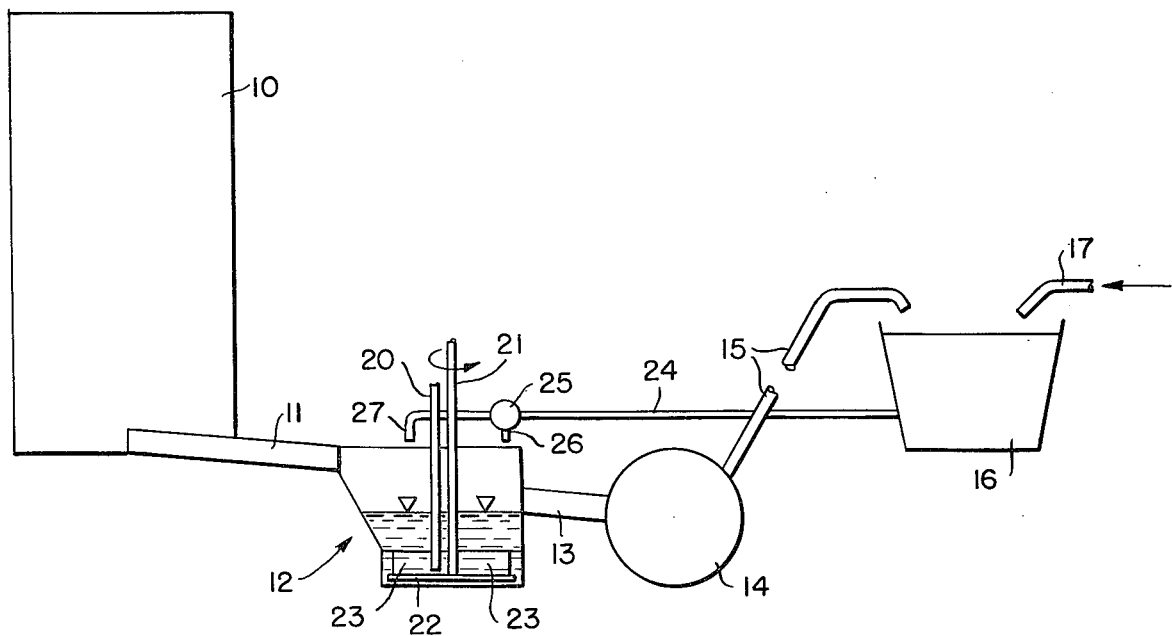
FIG. 1 shows a diagrammatic representation, not to scale, of a plant in accordance with the invention.

In FIG. 1, 10 designates a silo or storage bin having a conveying device 11 thereon. Directly following said conveying device is provided a siphon 12, said siphon being sealedly connected to said conveying device 11. Provided on the outlet side of the siphon is a conduit 13 which leads to a crushing mill 14. From said crushing mill 14, the crushed material, together with more or less water, is conducted through a conduit 15 to the mixing vessel 16. The mixing vessel 16 is further provided with a water-supply pipe 17.

It is significant that the conduit 13 as well as the conduit 15 may be of any form. It is not necessary to adhere to straight-line connections between the individual parts or components; thus, for example, the conduit 15 might be two or also twenty meters long, which is not critical in regard to the transportation because, here, crushed material is transported in water.

The siphon 12 illustrated in FIG. 1 shows a substantially square block-like structure with a partition 20 in the middle thereof which, however, does not extend down to the bottom of the siphon. In the base or bottom portion of the siphon there is located a tray or plate 22 having a plurality of radially extending webs or ribs 23 thereon. The tray or plate is connected to a drive shaft 21 which is supported outside the siphon and is also driven outside the siphon as is indicated by an arrow. A specific water level is adjusted in the siphon, as is indicated by the two triangles.

A conduit 24 extends from the mixing vessel 16 to a change-over valve 25 which is capable of connecting the conduit 24 either to a conduit 26 or to a conduit 27. The two conduits 26 and 27 may of course also be separately connected to the mixing vessel 16 by separate conduits, further shutoff valves being provided for each of said conduits.

Before the preparation apparatus proper is put into operation, a specific amount of water is introduced into the mixing vessel 16. From there, water is admitted to the siphon, through the conduit 24, either to one or the other side of the siphon. Finally, the coveying device 11 is put in motion so that material gets into the left side of the siphon 12, said material being conveyed from the left side to the right side of the siphon by the rotating plate or tray 22. Depending on the amount of water supplied through the conduit 27, more or less solid material is carried to the right side of the siphon and finally gets through the conduit 13 into the crushing mill. From there, the crushed material, together with water, is conducted through the conduit 15 into the mixing vessel. In the mixing vessel, the material carried into the latter separates from the water, and water can be transfered, in the desired amount, into the siphon via the conduit 24. Only after a sufficient amount of solid foodstock has been introduced into the mixing vessel 16 will the further transportation be stopped and the mixing device (not shown) in the mixing tank 16 be put in motion.

Figure 2:
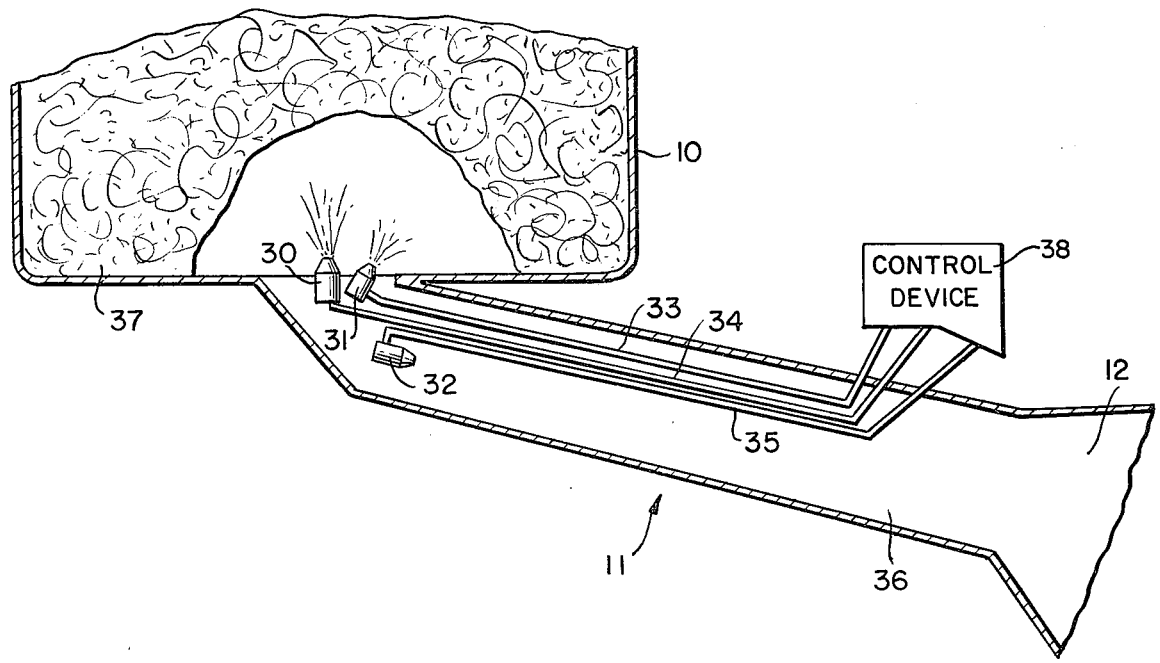
FIG. 2 shows a diagrammatic representation, also not to scale, of a modified embodiment according to the invention.

FIG. 2 shows a modified conveying device according to the invention. This conveying device comprises substantially a cylindrical conduit 36 which has one end thereof sealedly connected to the siphon 12 and the other end sealedly connected to the bottom of the silo 10. Nozzles 30 and 31 are located at the lower end of the silo or the lower end of said conduit. Only two nozzles are shown, but there may of course be provided a plurality of nozzles and there may also be used movable nozzles, e.g. wobble nozzles, so that when the nozzles 30 and 31 are put in motion by supplying water through the shown conduits 33 and 34, material is removed from the foodstock 37 contained in the silo 10 in a more or less conical region. When the supply of water to the nozzles 30 and 31 is discontinued, the dislodged material can collect at the lower region of the silo 10 or at the beginning of the conduit 36. Now, a nozzle 32 is supplied with water under pressure through a conduit 35, so that the collected material can be conveyed into the siphon.

The conveying device shown in FIG. 2 has been described in broad outline. Any kind of nozzles or nozzle forms may be used and it is also contemplated to provide for a pulsed pressurization of the water so as to achieve an optimum dislodging effect. In any case, the nozzles 30 and 31 on the one hand and the nozzles 32 on the other hand must be operated alternately, which, however, can easily be controlled by a preset program.

Figure 3:
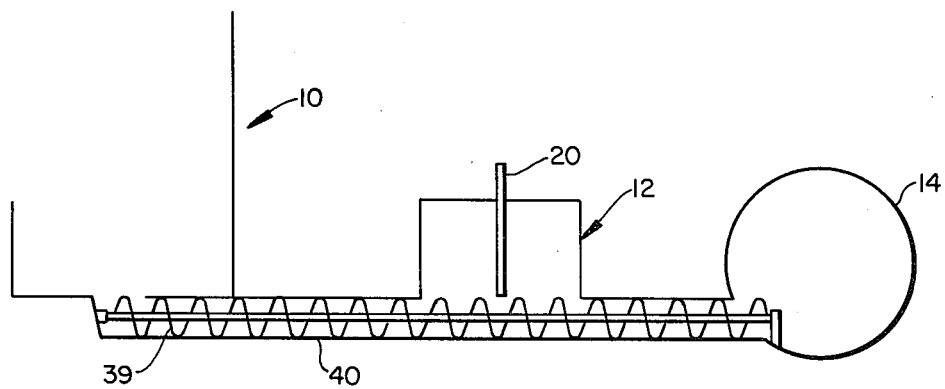
FIG. 3 shows a diagrammatic representation of an embodiment having a worm disposed in a housing.

FIG. 3 shows another modified conveying device according to the invention. In this embodiment, a worm 39 is accommodated in a housing 40, the housing being connected at one end to the lower end of silo 10 and at another end to the inlet side of mill 14. Housing 40 is a part of siphon 12. In this embodiment, the worm and housing provide the conveying device that conveys solid foodstock and water from one side of the siphon to the other.

I claim:

1. A plant for the preparation of fodder comprising a portion of solid foodstock in the form of grains or kernels and a portion of water, said plant comprising a silo for holding said foodstock, a means in sealed communication with said silo for removing said foodstock from said silo, a water-containing siphon disposed to receive foodstock removed by said means, at least a portion of said siphon being in sealed communication with said means, and a crushing mill disposed to receive foodstock from said siphon, whereby foodstock is removed and passed through said siphon to said crushing mill without permitting air to enter said silo.

2. The plant according to claim 1, wherein said means for removing foodstock comprises at least one water dislodging spray nozzle located in the base of said silo for dislodging solid foodstock in said silo and a conveying means for conveying dislodged foodstock to said siphon.

3. The plant according to claim 2, wherein said conveying means comprises at least one conveying water nozzle.

4. The plant according to claim 3, further comprising a control device for alternatingly supplying water to said dislodging nozzle or said conveying nozzle.

5. The plant according to claim 2, wherein said dislodging nozzle is movable, rotatable or swingable.

6. The plant according to claim 3, further comprising water supply conduits for supplying water to said dislodging nozzle and said conveying nozzle and a sealingly connected conduit that is sealingly connected to said silo and to said siphon, whereby said dislodging nozzle, conveying nozzle and water supply conduits are disposed within said sealingly connected conduit and dislodged foodstock is conveyed to said siphon through said sealingly connected conduit.

7. The plant according to claim 1, wherein said siphon comprises an inlet side and an outlet side, said inlet side being sealingly connected to said means for removing foodstock and said outlet side being connected to said crushing mill, wherein a partition separates said inlet and outlet sides but defines an opening adjacent to the bottom of the siphon such that said inlet and outlet sides communicate with each other.

8. The plant according to claim 7, wherein said siphon further comprises a second conveying means disposed adjacent to said opening for conveying dislodged foodstock and water from said inlet side to said outlet side.

9. The plant according to claim 8, wherein said second conveying means is a rotatable member disposed on both sides of said partition through said opening, said member being provided with webs or ribs.

10. The plant according to claim 9, wherein said rotatable member further comprises a drive shaft that extends upwardly out of said siphon, said drive shaft being supported and driven outside said siphon.

11. The plant according to claim 7, further comprising a water supply conduit for introducing water into said inlet side and a water supply conduit for introducing water into said outlet side.

12. The plant according to claim 11, further comprising at least one valve for switching a water supply between said inlet side water supply conduit and said outlet side water supply conduit.

13. The plant according to claim 11, further comprising a mixing vessel disposed to receive crushed foodstock from said crushing mill, wherein said crushed foodstock is mixed with water.

14. The plant according to claim 13, further comprising a connecting conduit for connecting said inlet side water supply conduit and said outlet side water supply conduit to said mixing vessel.

15. The plant according to claim 8, wherein said siphon comprises a housing connected at one end to a lower end of said silo and at another end to said mill, wherein said second conveying means comprises a worm accommodated in said housing.

* * * * *

UNITED STATES PATENT AND TRADEMARK OFFICE
CERTIFICATE OF CORRECTION

PATENT NO. : 4,464,984
DATED : August 14, 1984
INVENTOR(S) : Hinrich Haake

It is certified that error appears in the above-identified patent and that said Letters Patent is hereby corrected as shown below:

Column 5, line 17, after "outline", insert -- only --.

Column 5, line 24, after "by", insert -- control device 38 in accordance with --.

Signed and Sealed this

*Eighth* Day of *January 1985*

[SEAL]

*Attest:*

*Attesting Officer*

GERALD J. MOSSINGHOFF

*Commissioner of Patents and Trademarks*